United States Patent Office 3,436,574
Patented Apr. 1, 1969

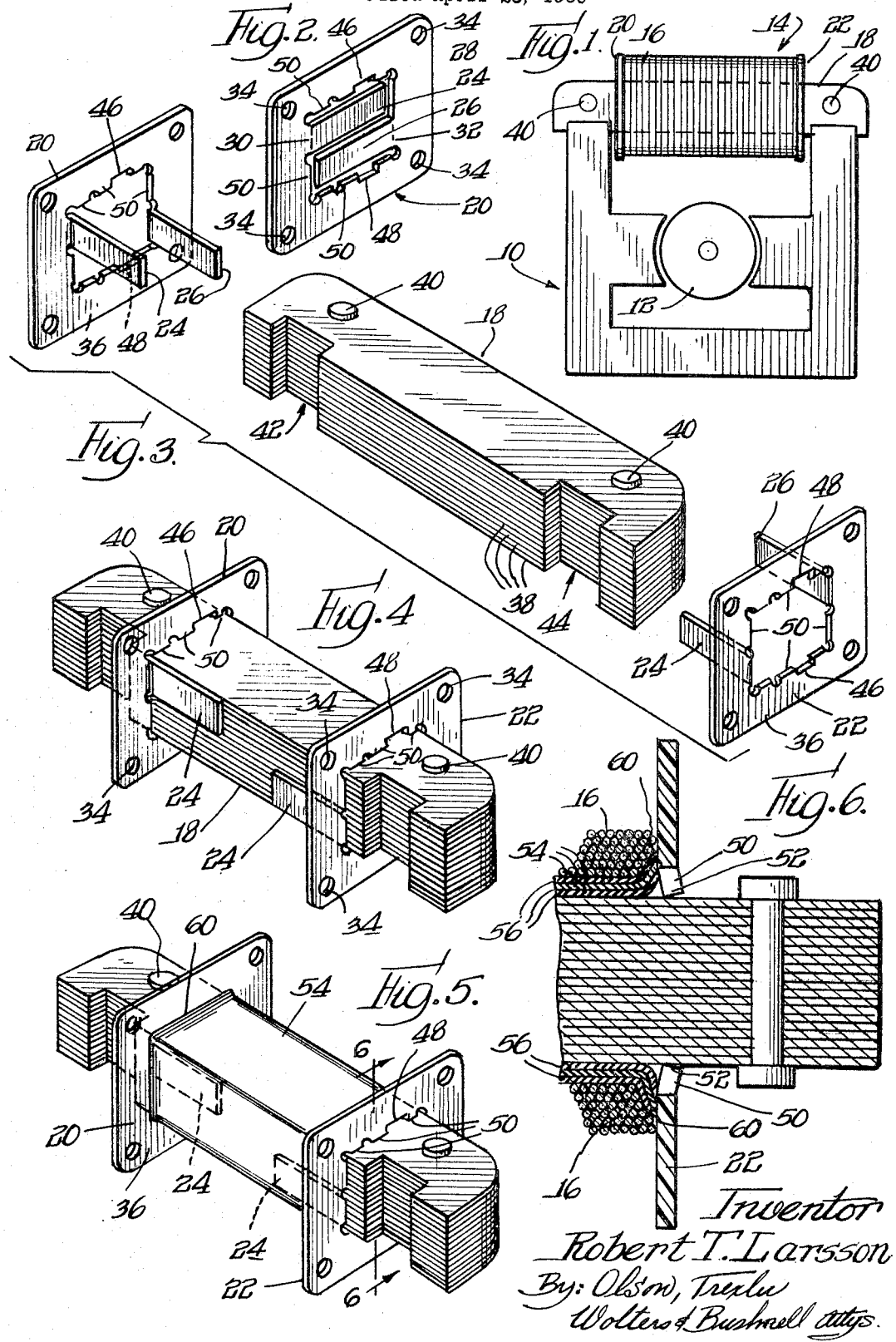

3,436,574
COIL BOBBIN WITH MAGNETIC CORE FOR DYNAMOELECTRIC MACHINES
Robert T. Larsson, Mount Prospect, Ill., assignor to Midland Engineering & Machinery Company, Rosemont-Des Plaines, Ill., a corporation of Illinois
Filed Apr. 25, 1966, Ser. No. 545,106
Int. Cl. H02k 1/18
U.S. Cl. 310—194                                    12 Claims

ABSTRACT OF THE DISCLOSURE

A magnetically susceptible laminated corepiece for an electric motor with insulating flanges placed over the corepiece for positioning a coil subsequently wound in place. The flanges have tabs that extend along the corepiece. An adhesively coated layer of insulation is wound on the corepiece over the tabs to lock the flanges in place and to insulate the winding from the corepiece.

---

This invention relates generally to the field or stator of an electric motor, and more particularly to a protective shield between the pole and the field windings. It is a common practice, in the construction of electric motors, to utilize a nylon shield or bobbin between the polepiece and the field or stator winding. The nylon bobbin provides electrical insulation between the wires of the field winding and the metal polepiece. The bobbin also positions the numerous windings on the polepiece and protects the insulation in the windings from being damaged by the corners of the polepiece.

The widespread industry acceptance of these nylon bobbins is evidence of their generally satisfactory service. However, the nylon bobbins have several drawbacks which have been tolerated by the industry. The nylon bobbins, which are slid over the polepiece, are often displaced longitudinally along the polepiece as the motor is being assembled or used. This slight displacement affects the distribution of the magnetic field from a stator, and, consequently, the rotation of the armature. In addition, the nylon bobbins are molded to a length which is determined by the size of wire and number of windings utilized in the field coil. Therefore, different bobbins must be molded for field windings having different lengths. It is apparent that this custom molding of the nylon bobbin increases the cost of making the field coil or winding for a motor.

Therefore, one of the objects of this invention is to provide a relatively inexpensive bobbin assembly which can be utilized with coil windings of various lengths.

Another object of this invention is to provide a bobbin assembly, for a polepiece, which is easy to assemble and is fixedly positioned on the polepiece.

These and other objects and features of the invention will be more apparent upon a reading of the following detailed description, taken in connection with the accompanying drawings, wherein:

FIG. 1 is a schematic drawing of a motor utilizing a preferred embodiment of the bobbin assembly;

FIG. 2 illustrates a flange member for the bobbin assembly;

FIG. 3 shows a pair of the flange members of FIG. 2 positioned adjacent opposite ends of a corepiece for the electric motor of FIG. 1;

FIG. 4 shows the flange members of FIG. 3, positioned on the corepiece;

FIG. 5 illustrates the complete bobbin assembly wherein a layer of insulating material has been wrapped around the corepiece intermediate the two flange members of FIG. 4; and FIG. 6 is an enlarged cross sectional view, taken along the line 6—6 of FIG. 5, of the intersection between the flange members, the corepiece, and the layer of insulating material.

Referring now to the drawings in greater detail, there is shown in FIG. 1 a schematic view of a motor 10 having an armature or rotor 12 and a field or stator winding 14. The field or stator winding 14 includes a coil 16 of an electrically conductive material, such as copper wire. The coil 16 is mounted on a corepiece 18 of a magnetizable material from which the magnetic field for the stator emanates when the coil 16 is connected to a source of electrical power. The field coil 16 is held in a predetermined position on the corepiece 18 by a pair of spaced-apart, identical flange members 20 and 22.

The flange member 20 is shown in greater detail in FIG. 2 as it appears after an initial forming or stamping operation. Since the flange members 20 and 22 are identical only the flange member 20 has been shown. The flange members are formed of "fish paper," hardboard, or a suitable polymeric material. The generally rectangular flange member 20 is formed with a pair of tab or leg members 24 and 26. The leg members are formed from the central portion of the flange by the generally Z-shaped aperture 28. The two leg members 24 and 26 are serrated at their bases 30 and 32 so that the leg members may be extended outwardly relative to the flange member 20. It should be noted that the Z-shaped aperture 28 is relatively thin and that there will be a low scrap rate from the stamping operation in which the flange member is formed. The flange member also includes a plurality of apertures 34 through which wires from the coil 16 may be extended.

The manner of assembling the flange members 20 and 22 on the corepiece 18 is apparent from a comparison of FIGS. 3 and 4. In FIG. 3, the two flange members 20 and 22 are shown in a position adjacent opposite end portions of the corepiece 18 with the leg members 24 and 26 extending inwardly toward each other and the center of the corepiece. The leg members are bent outwardly, at the perforations 30 and 32, at a slightly acute angle relative to the base portion 36 of the flange member. The two leg members 24 and 26 guide the sliding of the flange members onto the corepiece 18 to the position shown in FIG. 4.

The corepiece 18 is fabricated from a plurality of layers 38 of a magnetizable material. The layers 38 are secured together by rivets 40 at the outer end portions of the corepiece 18. A pair of slots 42 and 44 are cut into the outer end portions of the corepiece 18 so that the corepiece can be firmly held in position in the motor 10. The flange members 20 and 22 are formed with a pair of recesses 46 and 48 through which the outer end portions of the rivets 40 pass as the flange members are slid into the position shown in FIG. 4 on the corepiece 18. As the flange member is slid past the slots 42 and 44 in the corepiece, the inwardly extending leg members 24 bridge the slots and prevent the flange member from catching on the corners of the slots. The distance between the flange members is, of course, determined by the length of the coil which is to be wound on the corepiece. That is, the longer the coil the greater is the distance between the flange members.

As is best seen in FIGS. 2, 4 and 6, the flange members 20 and 22 include a plurality of inwardly extending ears 50 which impinge on the surface of the corepiece 18. The ears 50 are bent outwardly, as the flange members 20 and 22 are slid over the end portions of the corepiece, so that the inner corners 52 (see FIG. 6) of the ears slide on the surface of the corepiece. The ears 50 engage the surface of the corepiece, at the corners 52. This engagement of the corners 52 with the surface of the corepiece prevents the flange members 20 and 22 from being displaced outwardly relative to the corepiece when the corepiece is being wound with the coil 16 and during the use of the motor 10. It should be noted that the locking action from the ears 50 occurs only when the flange members 20 and 22 are moved outwardly relative to the corepiece. The ears 50 will not bind on the surface of the corepiece when the flange members 20 and 22 are slid into position in an inwardly direction on the corepiece.

From a consideration of FIGS. 5 and 6, it can be seen that the interior portion of the corepiece 18 is covered by a plurality of layers 54 of an insulating material, such as paper or a polymeric material. The insulating layers 54 are coated with a suitable adhesive 56 which secures the insulating layers 54 to the surface of the corepiece 18 and the legs members 24 and 26. In the preferred embodiment of the invention, pressure sensitive adhesive tape is utilized for the insulating layers 54. The pressure sensitive adhesive tape, by adhering to the corepiece and flange members 20 and 22, interconnects the shielding or bobbin assembly and firmly secures the flange members to the corepiece.

Although in the preferred embodiment the layers of insulating material are wrapped around the tab members 24 and 26, it is contemplated that the layers of insulating material could be wrapped around the corepiece before the flange members are placed on the corepiece. The flange members would then be slid over the insulating material into position on the corepiece and the coil of wire 16 securely wrapped around the tab members 24 and 26 to position the flange members on the layers of insulating material 54. The ears 50 would engage the insulating material and prevent the flange members from being displaced relative to the core member 18 while the wire 16 was being wrapped around the corepiece intermediate the two flange members. It is also contemplated that plain paper, which is not coated with a pressure sensitive adhesive, could be utilized for the insulating layers 54.

As is best seen in FIG. 6, the insulating layers 54, in the preferred embodiment, are bent outwardly at a juncture 60 between the insulating layers and the flange members 20 and 22. This outwardly extending portion of the insulating layers 54 engages the interior surface of the flange members 20 and 22 and is secured to these surfaces by the pressure sensitive adhesive 56. This outwardly extending portion of the insulating layers 54 provides a continuous shielding assembly so that the wires 16 cannot slide into the juncture 60, between the flange members and the insulating layers 54, and contact the corepiece 18.

The operation of the bobbin or shield assembly shown in FIGS. 1 to 6 will be largely apparent from the foregoing description. However, for purposes of affording a more complete understanding of the invention, a functional description is provided of the mode in which the component parts thus far identified cooperate. The field winding or stator for the motor 10 is fabricated by sliding a pair of flange members 20 and 22, having inwardly extending leg members 24 and 26, onto the corepiece 18. The flange members are positioned a predetermined distance apart, depending on the length of the coil to be wound on the corepiece. After the flange mambers 20 and 22 have been positioned on the corepiece 18, with the leg members 24 and 26 abutting opposite outer surfaces of the corepiece, a plurality of layers of a suitable insulating material is wrapped around the interior portion of the corepiece intermediate the two flange members 20 and 22. In a preferred embodiment of the invention, these layers of insulating material are formed by a pressure sensitive adhesive tape having a width slightly larger than the length of the coil to be wound. The adhesive coating on the tape will secure the leg members 24 and 26 and the flange members against longitudinal movement relative to the corepiece 18. The flange members are further restrained against longitudinal movement by the inwardly extending ears 50 which impinge on the surface of the corepiece and lock the flange members against outward movement relative to the corepiece.

Although a paper tape, which is coated with a pressure sensitive adhesive, is utilized for the insulating layer in the preferred embodiment of the invention, it is contemplated that the insulating layers 54 could be formed by a band of paper or polymeric material which could be secured, to itself, at the outer end of the band. It is also contemplated that the shield or bobbin assembly could be utilized in other electrical devices than the electric motor 10. Therefore, while a particular embodiment of the invention has been shown, it should be understood that the invention is not limited thereto, since many modifications may be made; and it is, therefore, contemplated to cover by the appended claims any such modifications as fall within the true spirit and scope of the invention.

What is claimed is:

1. An assembly comprising a corepiece, first and second outwardly extending flange members mounted on said corepiece for positioning a coil of electrically conductive wire on said corepiece, said first and second flange members having tab means in abutting relation with a surface of said corepiece, and a layer of insulating material positioned intermediate said first and second flange members for insulating the coil of wire from said corepiece, said layer of insulating material overlying said tab means and thereby securely fastening said first and second flange members against movement relative to each other and said corepiece.

2. An assembly as set forth in claim 1 wherein said layer of insulating material is formed of pressure sensitive adhesive tape.

3. An assembly as set forth in claim 1 wherein said tab means includes first and second longitudinally extending tab members located on opposite sides of said corepiece.

4. An assembly as set forth in claim 1 wherein said first and second flange members have inwardly extending ear means which impinge on the surface of said corepiece to lock said flange members against movement relative to said corepiece.

5. An assembly as set forth in claim 1 wherein said first and second flange members have longitudinally extending tab means positioned adjacent to said corepiece, said layer of insulating material includes a band of paper coated with an adhesive and overlying said tab means, said adhesive securely interconnecting said band of paper, said corepiece, and said first and second flange members.

6. An assembly as set forth in claim 5 wherein said first and second flange members have inwardly extending ears means which engage opposite surfaces of said corepiece to restrain said flange members against movement relative to said corepiece.

7. An assembly as set forth in claim 6 wherein said first and second flange means includes a plurality of aperture means through which wires connected to said coil of wire may be extended.

8. An assembly comprising a member of magnetizable material, a layer of insulating material including a band of paper encompassing a portion of said member of magnetizable material, first and second flange means mounted adjacent to said layer of insulating material for positioning a coil of electrically conductive material on said member of magnetizable material, and ear means extending inwardly from said first and second flange means toward said member of magnetizable material to restrain said first and second flange means against movement relative to said member, said first and second flange means including first and second tab means between said insulating material and said member for further restraining said first and second flange means against movement relative to said member of magnetizable material.

9. An assembly as set forth in claim 8 wherein said band of paper is at least partially coated with an adhesive for securing said band of paper to said member of magnetizable material.

10. An assembly comprising a member of magnetizable material, a layer of insulating material encompassing a portion of said member of magnetizable material, first and second flange means mounted adjacent to said layer of insulating material for positioning a coil of electrically conductive material on said member of magnetizable material, first tab means extending from said first flange means toward said second flange means for securing said first flange means against movement relative to said member of magnetizable material, and second tab means extending from said second flange means toward said first flange means for securing said second flange means against movement relative to said member of magnetizable material.

11. An assembly as set forth in claim 10 further including an adhesive means for securing said layer of insulating material to said member of magnetizable material.

12. A method of assembling a shield to insulate a coil of wire from a corepiece comprising the method steps of; sliding first and second flange members onto said corepiece and placing tabs on said flange members along said corepiece; wrapping a layer of insulating material, which is at least partially coated with a pressure sensitive adhesive, around said corepiece intermediate said first and second flange members and over said tabs; and securing said layer of insulating material to said corepiece and to said first and second flange members by applying pressure to said pressure sensitive adhesive.

References Cited

UNITED STATES PATENTS

| | | | |
|---|---|---|---|
| 1,481,190 | 1/1924 | Durbin et al. | 310—194 X |
| 1,578,870 | 3/1926 | Thomson | 242—118.61 X |
| 1,953,035 | 3/1934 | Wyss | 336—208 |
| 1,956,881 | 5/1934 | Strait | 242—118.4 X |
| 2,644,651 | 7/1953 | Stahl et al. | 242—118.7 |
| 3,253,794 | 5/1966 | Twigg | 242—10 |
| 3,264,593 | 8/1966 | Cole | 336—208 X |

WARREN E. RAY, *Primary Examiner.*